United States Patent
Ellis et al.

(10) Patent No.: US 9,038,059 B2
(45) Date of Patent: May 19, 2015

(54) AUTOMATICALLY TARGETING APPLICATION MODULES TO INDIVIDUAL MACHINES AND APPLICATION FRAMEWORK RUNTIMES INSTANCES

(71) Applicant: International Business Machines Corporation, Armonk, NY (US)

(72) Inventors: Richard R. Ellis, Hampshire (GB); Matthew W. Leming, Hampshire (GB); Timothy J. Ward, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/837,583

(22) Filed: Mar. 15, 2013

(65) Prior Publication Data

US 2013/0283259 A1 Oct. 24, 2013

(30) Foreign Application Priority Data

Apr. 18, 2012 (GB) .................................. 1206824.3

(51) Int. Cl.
*G06F 9/445* (2006.01)
*G06F 9/50* (2006.01)

(52) U.S. Cl.
CPC ... *G06F 8/61* (2013.01); *G06F 8/60* (2013.01); *G06F 9/5055* (2013.01)

(58) Field of Classification Search
None
See application file for complete search history.

(56) References Cited

U.S. PATENT DOCUMENTS

| | | | |
|---|---|---|---|
| 6,117,187 A | 9/2000 | Staelin | |
| 6,442,754 B1 | 8/2002 | Curtis | |
| 6,948,059 B1 | 9/2005 | Sprecher et al. | |
| 8,577,937 B1 * | 11/2013 | Offer | 707/821 |
| 8,726,233 B1 * | 5/2014 | Raghavan | 717/113 |
| 2002/0103973 A1 | 8/2002 | Zimniewicz et al. | |
| 2003/0163807 A1 | 8/2003 | Drake et al. | |
| 2006/0010436 A1 * | 1/2006 | Henrickson et al. | 717/168 |
| 2007/0088799 A1 | 4/2007 | Luft et al. | |
| 2007/0234349 A1 * | 10/2007 | Ushiku | 717/174 |
| 2009/0313229 A1 * | 12/2009 | Fellenstein et al. | 707/3 |

(Continued)

FOREIGN PATENT DOCUMENTS

| | | |
|---|---|---|
| EP | 1376345 A2 | 1/2004 |
| GB | 2394570 A | 4/2004 |

(Continued)

OTHER PUBLICATIONS

Bartlett, OSGi In Practice, http://njbartlett.name/files/osgibook_preview_20091217.pdf, Dec. 17, 2009.*

(Continued)

*Primary Examiner* — Wei Zhen
*Assistant Examiner* — Timothy Duncan
(74) *Attorney, Agent, or Firm* — Cantor Colburn LLP; Rahan Uddin (57) ABSTRACT

Methods, computer program products, and systems for installing an application at a runtime instance. A method includes receiving a request to install an application and accessing data defining shared resources required by the application. Data that defines shared resources already installed at existing runtime instances is accessed. An existing runtime instance with the greatest number of installed shared resources common to the shared resources required by the application is selected. The application is installed at the selected runtime instance.

18 Claims, 8 Drawing Sheets

(56) References Cited

U.S. PATENT DOCUMENTS

| | | |
|---|---|---|
| 2010/0017503 A1 | 1/2010 | Kim et al. |
| 2010/0191713 A1 | 7/2010 | Lomet et al. |
| 2010/0257520 A1 | 10/2010 | Navarro et al. |
| 2011/0107103 A1 | 5/2011 | Dehaan et al. |
| 2011/0258461 A1 | 10/2011 | Bates |

FOREIGN PATENT DOCUMENTS

| | | | |
|---|---|---|---|
| JP | 2006323500 A | 11/2006 | |
| JP | 2007334869 A | 12/2007 | |
| JP | 2009508208 A | 2/2009 | |
| JP | 2010225099 A | 10/2010 | |
| JP | 2011221597 A | 11/2011 | |
| JP | 2011233146 A | 11/2011 | |
| KR | 101008927 | 1/2011 | |
| WO | WO2011069834 * | 6/2011 | ............... G06F 9/45 |
| WO | WO2011080063 A1 | 7/2011 | |

OTHER PUBLICATIONS

Afgan et al., "Applicaiton Sepcification Language (ASL)—A Language for Describing Applications in Grid Computing," University of Alabama at Birmingham, Department of Computer and Information Sciences, Birmingham, AL, 15 pages.

Zhang et al., "Integrating Resource Consumption and Allocation for Infrastructure Resources on-Demand," IEEE 3rd International Conference on Cloud Computing, 2010, pp. 75-82.

International Search Report dated Aug. 22, 2013.

Supplemental European Search Report for No. EP13779073 dated Jan. 19, 2015, pp. 6.

* cited by examiner

| Resource Identifier | Application Framework Runtime |
|---|---|
| R1 | Application Framework Runtime 1 |
| R2 | Application Framework Runtime 2 |
| R3 | Application Framework Runtime 2 |
| ⋮ | ⋮ |

AUTOMATICALLY TARGETING APPLICATION MODULES TO INDIVIDUAL MACHINES AND APPLICATION FRAMEWORK RUNTIMES INSTANCES

PRIORITY

This application claims priority to United Kingdom Patent Application No. 1206824.3, filed 18 Apr. 2012, and all the benefits accruing therefrom under 35 U.S.C. §119, the contents of which in its entirety are herein incorporated by reference.

BACKGROUND

The present invention relates generally to computer applications, and more specifically to installing computer applications at runtime instances.

The Open Services Gateway initiative (OSGi) is a modularity technology for Java™. Within OSGi, a bundle is a unit of modularity. One example of a bundle is a raw artefact of a binary Java jar file with additional bundle metadata that describes the identity and externals of the bundle. Herein, the bundle is referred to as the "bundle resource", the raw artefact is referred to as the "artefact resource", and the metadata for the bundle is referred to as the "metadata resource". Resources are also known as objects.

It is common for software applications to be composed of individual modules. Most application modules, such as Java Enterprise Edition (EE) enterprise archive (EAR) files or OSGi applications, will make use of one or more utility modules which provide reusable functionality. Typically, utility modules are packaged as part of the application module and referenced by the application module using metadata that is also part of the application module. Installation of the application module into an application framework typically involves copying both the application module and utility module to a single directory on a hard disk. Thus, if several different application modules are installed which make use of a common set of utility modules there will be multiple copies of the same utility module stored on the hard disk, and if the application modules are running in the same application framework runtime instance, there might also be several versions of the same utility module loaded into memory. This is obviously wasteful in terms of disk and memory usage, as well as in terms of the time spent loading the utility modules into memory.

A known solution to this problem is to make use of the concept of shared resources, known as shared libraries (for Java Platform, Enterprise Edition or Java EE (JEE) applications) or shared bundles in a common bundle repository (for OSGi applications). Utility modules which are likely to be common to several application modules are extracted from the application modules and installed as a shared library or common bundle in an application framework runtime instance. At application module installation time the application module is linked to the required shared libraries or bundles. As a result of this process, multiple application modules can make use of the same shared resource, even though there is only one copy of the shared resource on disk. Depending on the application framework, there may also only be one version of the shared resource loaded into memory.

The shared resource approach works well when application module developers and application framework administrators can work together, prior to application installation, to decide which utility modules should be made available as common resources. However, if an application module is to be deployed to an application framework that is provided using a platform as a service (PAAS) cloud then it is not possible to plan in advance those resources that can be shared.

SUMMARY

Embodiments include methods, computer program products, and systems for installing an application at a runtime instance. A method includes receiving a request to install an application and accessing data defining shared resources required by the application. Data that defines shared resources already installed at existing runtime instances is accessed. An existing runtime instance with the greatest number of installed shared resources common to the shared resources required by the application is selected. The application is installed at the selected runtime instance.

BRIEF DESCRIPTION OF THE SEVERAL VIEWS OF THE DRAWINGS

Embodiments of the present invention will now be described, by way of example only, with reference to the following drawings, in which.

DETAILED DESCRIPTION OF THE EMBODIMENTS

Embodiments of the present invention are directed to installing an application at a runtime instance. A request to install an application is received and data that defines shared resources required by the application is accessed. Data that defines shared resources already installed at existing runtime instances is also accessed. An existing runtime instance with the greatest number of installed shared resources common to the shared resources required by the application is selected. The application is installed at the selected runtime instance.

Using embodiments described herein it is possible to provide a mechanism where application modules can be automatically targeted to individual machines and application framework runtimes instances in a platform as a service (PAAS) cloud, based on the utility modules that they use. This approach saves disk space, memory and central processing unit (CPU) cycles when compared with installing each application module with its own copy of any utility modules. This saving benefits both individual machines in the cloud and the cloud as a whole. This is particularly beneficial in the case of commonly reused third party modules such as, for instance, common logging utilities that may be shared by many different applications.

When an application module is deployed to a PAAS cloud it is analysed by the cloud management software to determine the utility modules it contains. Then, existing application framework runtimes instances in the cloud are checked to see if any of them have matching utility modules already installed as, for instance, shared libraries or as bundles in an OSGi bundle repository. The application module is preferentially installed on an existing application framework runtime instance which already has the shared resources installed that match the utility modules of the application module.

At installation time all utility modules from the new application module are either converted into new shared resources or linked to existing ones. The application is targeted at the server in the cloud that provides as many of the requirements as possible. The conversion of the application from one including utilities by value to one including utilities by reference allows for a more flexible deployment. This approach means that application modules are automatically deployed so as to best make use of the existing runtime capabilities and configuration of the cloud. In particular, disk space and process memory is reduced as multiple copies of a utility module can be replaced with a single shared resource.

Embodiments may also include maintaining a table storing an identifier for each shared resource installed at an existing runtime instance, and accessing data defining shared resources already installed at existing runtime instances includes accessing the table. The management component within the computing network can maintain a lookup table that records all of the shared resources in use across all of the existing runtime instances. This provides a simple method of determining the shared resources currently deployed in the cloud computing environment when a new application is needed to be installed within the cloud. The table can be accessed to see which shared resources are currently installed at which specific runtime instance.

Following from the use of the table as outlined in the previous paragraph, embodiments may also include installing the application at the selected runtime instance, and updating the table with identifiers for each new shared resource installed during the installation of the application at the selected runtime instance. Each time a request to install an application is made and the best runtime instance has been selected for that application, the table can then be updated to reflect any new shared resources that will become available at the selected runtime instance, as a result of the installation. This provides an on-going update of the table of shared resources which can lead to future application installations being adapted to reflect the updated table.

Embodiments may also include determining the free capacity available at existing runtime instances, and selecting the existing runtime instance with the greatest number of installed shared resources common to the shared resources required by the application comprises selecting only an existing runtime instance with sufficient free capacity to install the application. The selection of the runtime instance to use for the new application being installed can also take into account the amount of free memory available at each of the available runtime instances. The selection of the appropriate runtime instance can then be limited to only those that have sufficient free memory.

In addition, installing the application at the selected runtime instance may include removing from the application those shared resources already present at the selected runtime instance and installing the residual components of the application at the selected runtime instance. The installation of the application can be limited to installing only those modules needed over and above the shared resources already present at the selected runtime instance. This may be the most efficient method of installing the application and will save both processor and bandwidth usage.

Figure 1:
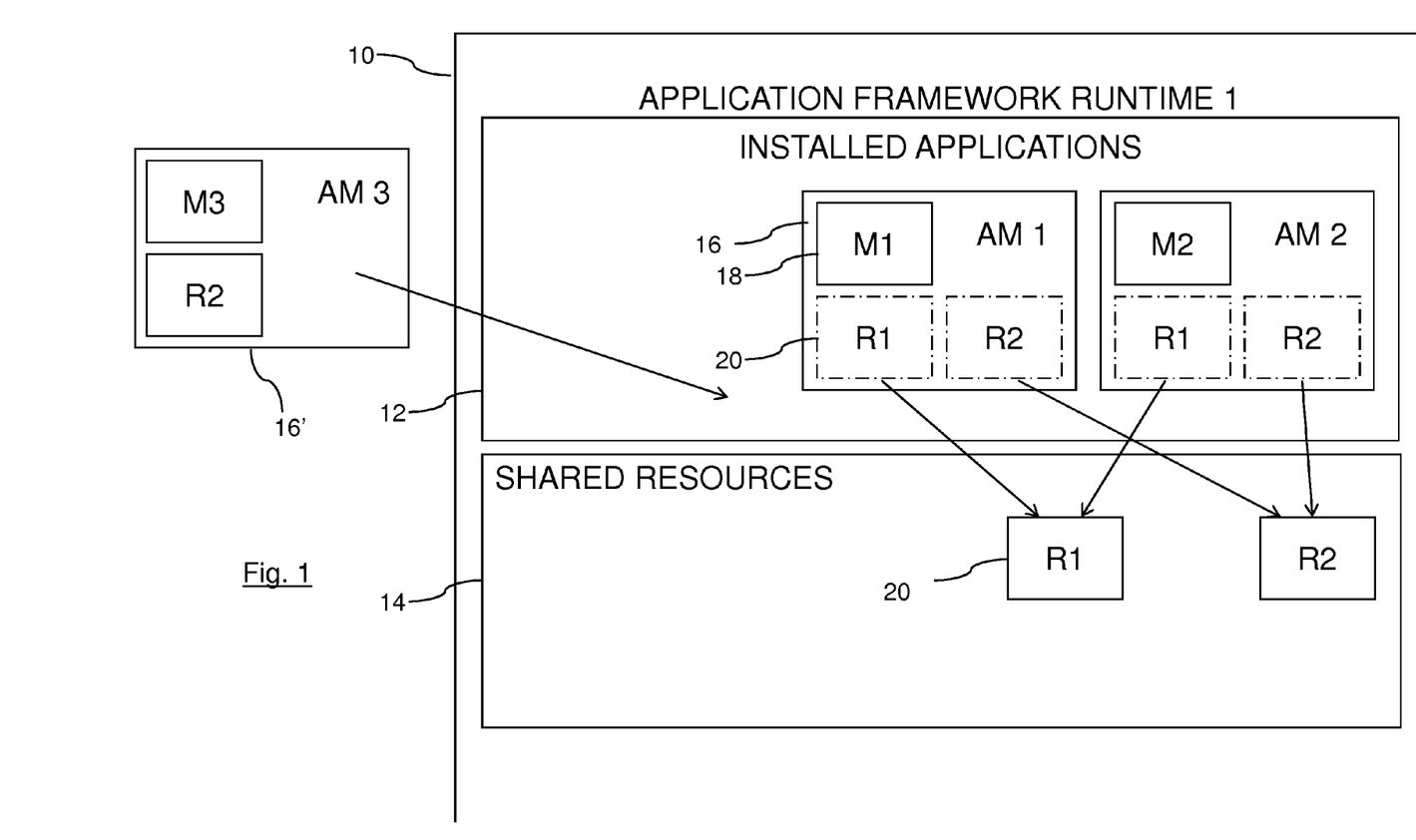
FIG. 1 is a schematic diagram of a runtime instance in accordance with an embodiment.

FIG. 1 shows an example of a runtime instance 10, which includes two specific locations 12 and 14 in accordance with an embodiment. Application specific modules are installed in location 12 and shared resources are installed in location 14. Two applications 16 (labelled AM1 and AM2 in FIG. 1) are shown as being installed in the application area of location 12. Each application 16 includes one or more application specific modules 18 and one or more shared resources 20. The application 16 labelled AM1 includes an application specific module 18 labelled M1 in FIG. 1 and the shared resources 20 labelled R1 and R2. Similarly, the application 16 labelled AM2 includes the application specific module 18 labelled M2 in FIG. 1 and the same shared resources 20 R1 and R2.

When the application 16 labelled AM1 was installed into the runtime instance 10, the application specific module 18 labelled M1 was installed in location 12 and the shared resources 20 labelled R1 and R2 were installed in location 14. The actual shared resources within the application 16 labelled AM1 were replaced with links to the shared resources 20 labelled R1 and R2. Subsequently, when the application 16 labelled AM2 was installed at the runtime instance 10, only the application specific module M2 was installed in location 12 and the shared resources 20 labelled R1 and R2 within the application 16 labelled AM2 were not installed as they were already present in location 14. The application 16 labelled AM2 was installed with links to the previously installed shared resources 20.

In the same way, when a new application 16' is to be installed, then the modules within that application 16' are examined to see how they compare to the shared resources 20 already installed within location 14 of the runtime instance 10. In this case, the new application 16' (labelled AM3 in FIG. 1) includes an application specific module labelled M3 in FIG. 1 and the shared resource 20 labelled R2 (such as a standard library). When this new application 16' is to be installed at the runtime instance, only the application specific module labelled M3 needs to be installed in location 12 and the shared resource 20 labelled R2 within the application 16" can be replaced with a link to the already installed copy of the shared resource 20 labelled R2 that is present within location 14.

Figure 2:
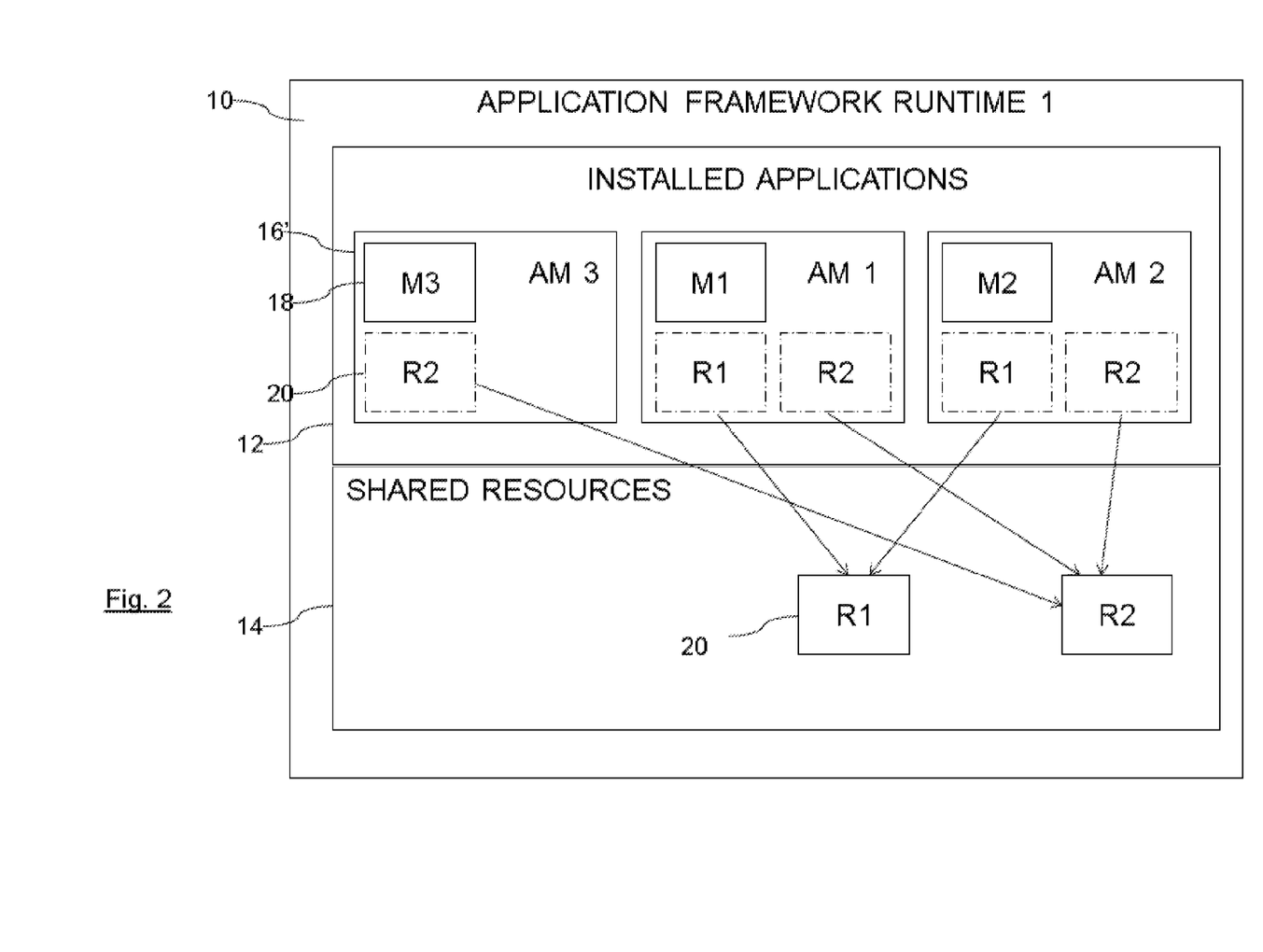
FIG. 2 is a further schematic diagram of the runtime instance, following installation of a new application in accordance with an embodiment.

FIG. 2 shows the runtime instance 10 after the installation of the third application 16' (which is labelled AM3 in FIG. 1). The application specific module 18 labelled M3 will be installed in location 12 and the shared resource 20 labelled R2 will not be installed, as there is already a copy of this specific shared resource 20 installed in location 14. The shared resource 20 labelled R2 in the application 16' is replaced with a link to the location of the shared resource 20 labelled R2 within the installation area 14. This means that duplicate copies of the same shared resources are not installed at the same runtime instance 10. Only new shared resources will be installed at location 14.

The methodology described with respect to FIGS. 1 and 2 provides an efficient process for installing applications at a runtime instance 10 and also provides efficient use of the resources available at the runtime instance 10. Memory usage is reduced and less bandwidth is consumed when applications are installed. All future applications installed at the same runtime instance 10 will go through the same process of only installing those shared resources 20 that are not already present installed at location 14. Each new application that is to be installed will be examined to identify those modules within the application that are application specific and those that are shared resources that might already be present.

In an embodiment, the runtime instance 10 is present on a server that is providing client devices with access to the applications 16 that are being hosted by the runtime instance 10. A client device will make a request to run an application 16 and a copy will be installed at a runtime instance 10 on an available server to provide the user of the client device with access to the application 16. The application 16 that is installed will include one or more application specific modules 18 and one or more shared resources 20. A shared resource 20 is a component that is essentially standardized in some sense, such as a library, and can be used by different applications in the same computing environment.

Figure 3:
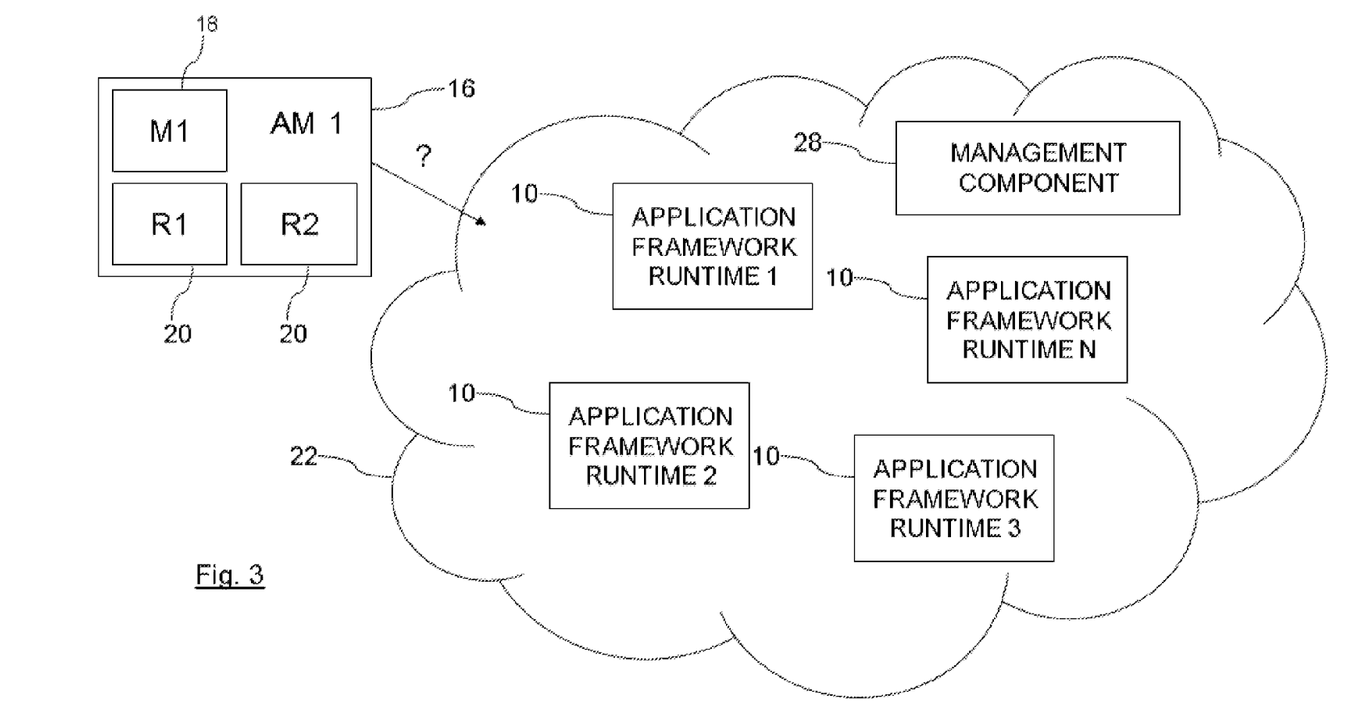
FIG. 3 is a schematic diagram of an application and a cloud computing environment in accordance with an embodiment.

FIG. 3 shows a more complex computing environment in accordance with an embodiment, which is essentially a cloud 22 comprised of a network of servers each providing one or more runtime instances 10. The cloud 22 is a computing resource that provides processing and storage functionality to client devices, commonly via sessions that users will initiate to access the computing functionality available. A management component 28 may manage the setting up of the sessions and the installation of applications that a user will access via their local client device. The underlying hardware resources that make up the cloud 22 are invisible to the client devices and the users are not aware of the underlying processes that provide their computing resources.

In this Figure, a new application 16 is shown that is to be installed somewhere within the cloud 22. This application 16 will have to be installed in an existing runtime instance 10 or a new instance will have to be created specifically for the new application 16. This application 16 includes modules such as the application specific module 18 and shared resource 20. The question mark shown on the arrow from the application 16 to the cloud 22 indicates the open question of where best to install the application 16. The management component 28 within the cloud 22 may perform an analysis of the runtime instances 10 within the cloud 22.

This analysis determines the most logical location for the installation of the new application 16 within the cloud 22, and this process is described in more detail below. In summary, in accordance with an embodiment, after receiving a request to install an application 16, a management component 28 accesses data that defines the shared resources 20 required by the application 16 and accesses data that defines shared resources 20 already installed at existing runtime instances 10. The management component 28 selects an existing runtime instance 10 with the greatest number of installed shared resources 20 common to the shared resources 20 required by the application 16 and installs the application 16 at the selected runtime instance 10.

Figure 4:
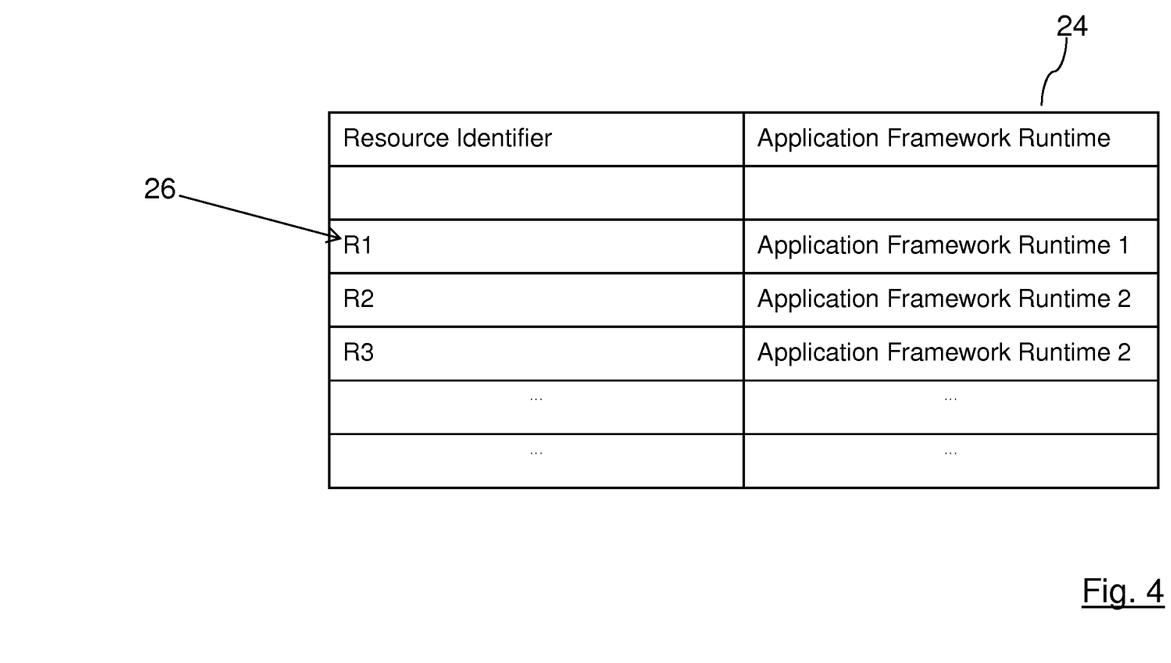
FIG. 4 is a diagram of a shared resource lookup table in accordance with an embodiment.

FIG. 4 illustrates an embodiment of a shared resources lookup table 24, which may be used to store an identifier 26 for each shared resource 20 that is installed at an existing runtime instance 10. The lookup table 24 includes rows, where each row is dedicated to a specific shared resource 20 that is represented in the table 24 by its identifier 26. Each row also contains a list of the runtime instances 10 that contain the specific shared resource 20 of that row. Although the table 24 of FIG. 4 shows each shared resource 20 as only present at a single runtime instance 10, it is highly likely, in a practical implementation that each shared resource 20 will be present at multiple runtime instances 10.

The shared resource identifier 26 that is used within the lookup table 24 may be the name of a file, module or library that is commonly used in a specific technology environment. Additionally or alternatively, the shared resource identifier 26 could be created using a predefined hashing function on the shared resource 20, if there is likely to be more than one name used for the same shared resource 20. This will allow the management component 28 to identify any shared resources 20 that constitute part of a new application 16 that is received. The management component 28 may perform the hashing function on each new shared resource to obtain the shared resource identifier 26.

In an embodiment, the management component 28 stores and maintains the table 24 and can constantly update the table 24 as new applications 16 are installed. For example, a new application 16 may be received that includes four shared resources 20, two of which are already present in a specific runtime instance 10, but two of which are completely new to the management component. In an embodiment, the new application 16 will be installed at the specific runtime instance 10 that already has the two common shared resources 20 present and the table 24 will be updated to show that two new shared resources 20 that were not previously known are now installed at that specific runtime instance 10.

Figure 5:
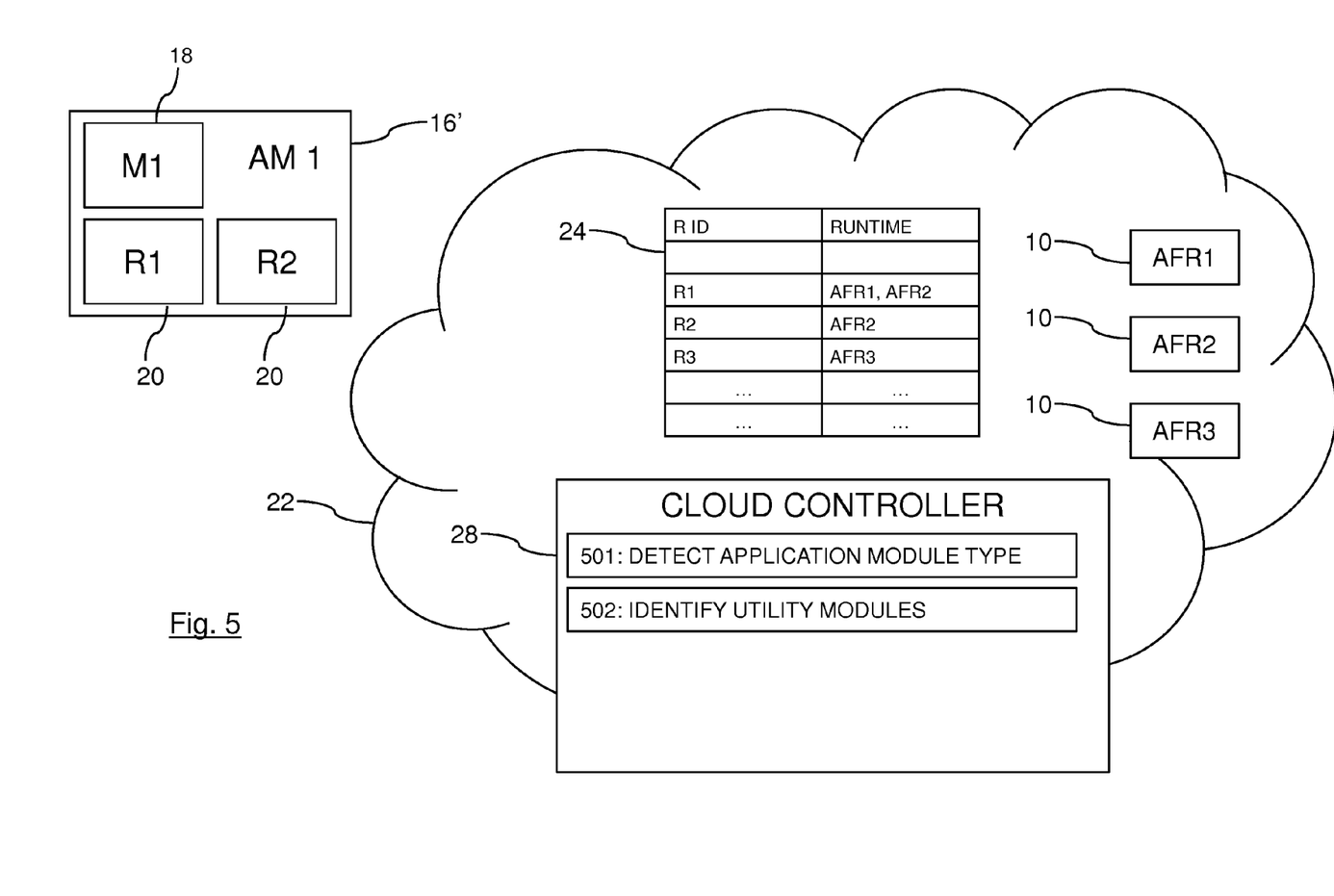
FIGS. 5, 6 and 7 are further schematic diagrams of a cloud computing environment in accordance with an embodiment.

FIG. 5 illustrates the first process steps that are to be taken when a new application 16' is to be installed somewhere within the cloud 22, in accordance with an embodiment. A user deploys an application module to the cloud 22. At deployment time the cloud 22 controlling software being run by the management component 28 performs the following steps, starting by detecting the type of application module at block 501, for example as a JEE ear file or as an OSGi application file. File extensions can be used or knowledge about the structure of the programming environment in order to detect the different application module types that are present within the new application 16' that is to be installed at a runtime instance 10 that is already installed within the cloud 22.

Using the knowledge of the application module types, the management component 28 identifies utility modules at block 502, for example jar files referenced from a manifest of an Enterprise Java Beans (EJB) jar file in the ear file, or bundles included by value in an OSGi application. All utility modules will be converted to become a shared library or shared bundle even if only used by a single application module. These modules can be considered to be shared resources 20. Any module within the application 16' that is generic in nature and not specific to that particular application can be a shared resource 20. These are the modules that can be reused between applications 16 within the same runtime instance 10.

The management component 28, which runs the controlling software for the cloud 22, is neutral as far as the programming language used for the new application 16' is concerned. Any new application 16' installed with the cloud 22 can be handled in the methodology described here, as long as the application 16' comprises discrete modules, more than one of which can be shared between applications 16. As shown in FIG. 5, the management component 28 examines the modules that make up the new application 16' at block 501 and identifies the "utility modules" within that application 16' at block 502, in order to perform a more efficient installation of that application 16' within the cloud 22.

Figure 6:
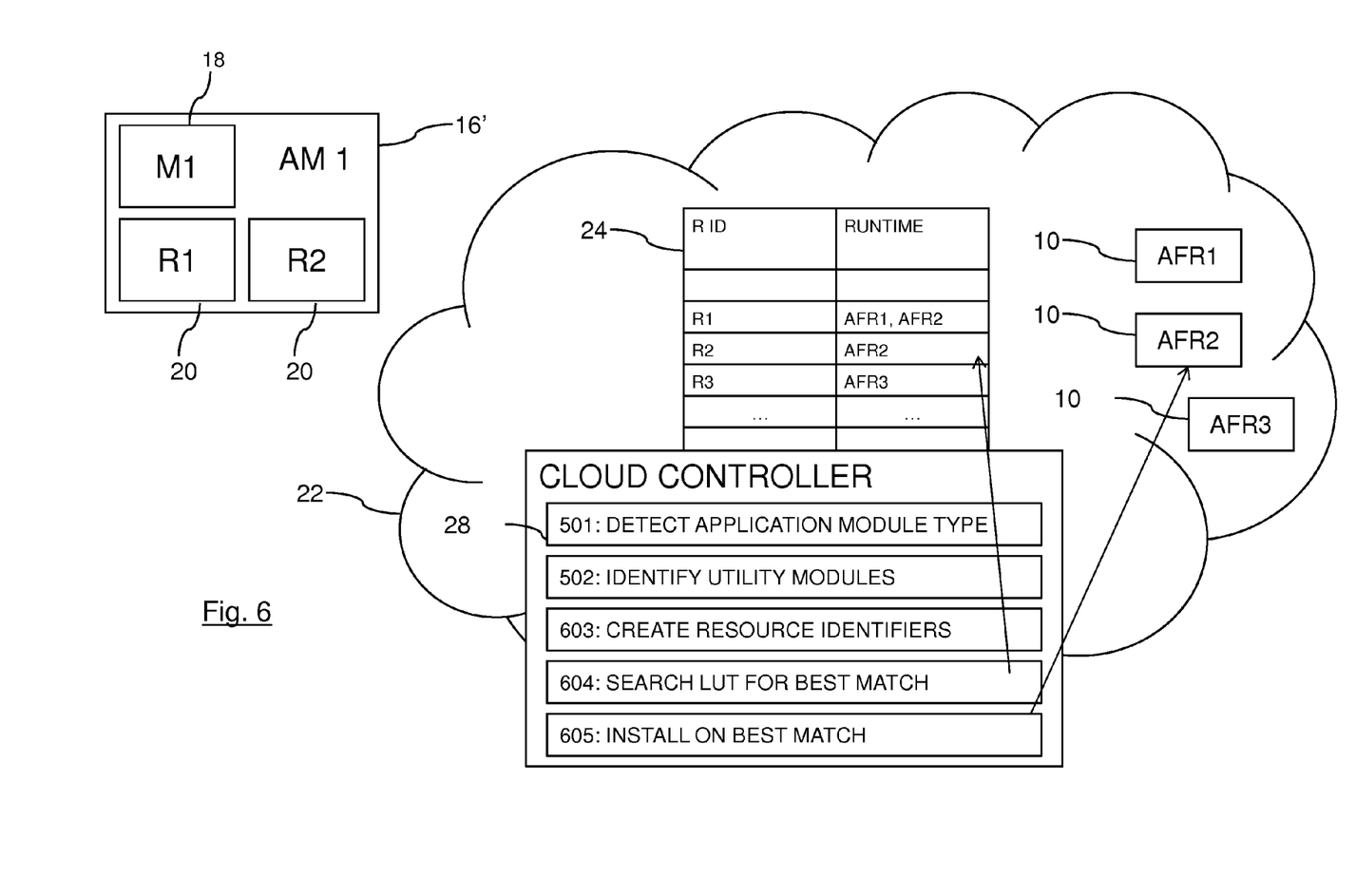

FIG. 6 shows the next steps in the process in accordance with an embodiment. The management component 28 creates an identifier 26 for each shared resource 20 in the new application 16' at block 603. This resource identifier 26 will be used for comparison with other shared resources 20 to check for equality. This may be generated via a hash function or could be name based or could just be the bytes that make up the shared resource 20. At block 604, the management component 28 searches for all application framework runtimes 10 in the cloud 22 that already have at least one of the shared resources 20 installed using the shared resource lookup table 24, which maps shared resource identifiers 26 to the runtimes 10 on which they are installed, for example, by searching the lookup table 24. These runtimes 10 are considered potential candidates for installation of the new application 16'.

At block 605 in FIG. 6, the management component 28 then installs the application module 18 on the runtime 10 which best satisfies the following set of criteria in that it has as many common shared resources 20 as possible and has sufficient free capacity to meet the performance requirements of the application module 18. At installation time the management component 28 creates any new shared resources/link from the application module 18 to existing shared resources 20 as needed. In this way, the management component 28 may select the most efficient location for the new application 16'. This efficiency reduces the amount of data that has to be installed and also reduces the bandwidth requirement of the installation process, with minimal additional effort by the management component 28.

In the example embodiment of FIGS. 5 and 6, the new application 16' includes two shared resources 20, which are labelled R1 and R2. The runtime instance 10 that is labelled AFR1 has the shared resource 20 labelled R1 already present, according to the lookup table 24. However, the runtime instance 10 that is labelled AFR2 has both of the shared resources 20 labelled R1 and R2 present, again as can be seen from the lookup table 24. In an embodiment, this means that the runtime instance 10 labelled AFR2 is the better location for the installation of the new application 16' and therefore the management component 28 installs the new application 16' at this runtime instance 10, as shown by the arrow in FIG. 6.

If a matching runtime 10 cannot be found for the installation of the new application 16', the management component 28 may provision a new runtime 10 from the cloud 22 as normal and the application module 18 and new shared resources 20 are installed onto it. Finally, the management component 28 may update the shared resource lookup table 24 with any newly created shared resource identifiers 26 and the runtime 10 on which they are installed. This provides a dynamic table 24 that will be continually updated each time a new application 16' is installed and the efficiency of runtime installation will continue for each new application 16' as user requests are received to install applications 16 within the cloud 22.

Figure 7:
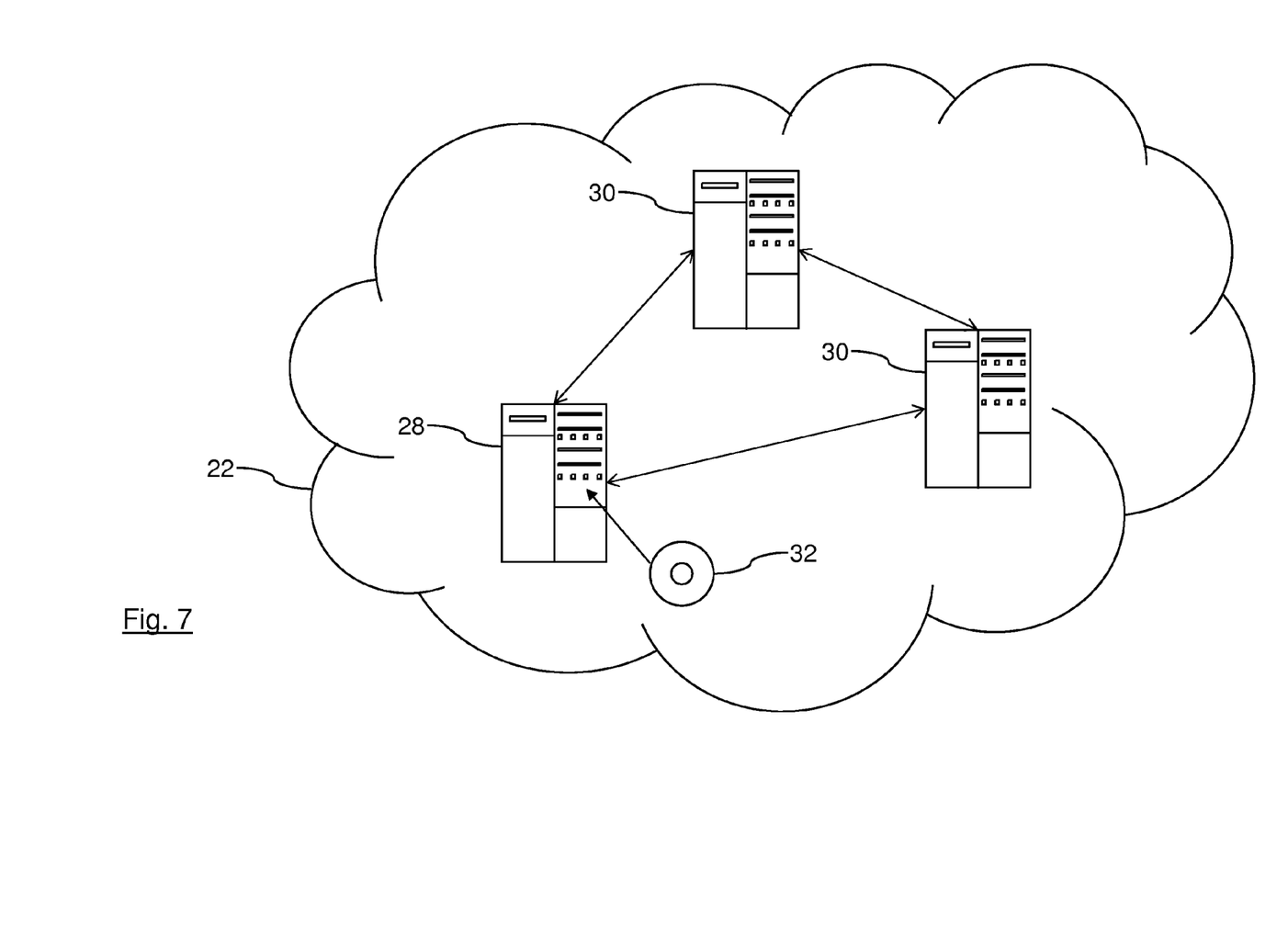

FIG. 7 shows the management component 28 as a server within the cloud computing network 22 in accordance with an embodiment. The management component 28 is in communication with other servers 30 that constitute the cloud computing environment 22. A large number of different machines will make up the cloud 22 including servers 30 and dedicated storage devices that serve multiple components within the cloud 22. The management component 28, in relation to the installation of a new application 16, can be controlled by a computer program product that can be provided from a computer readable medium such as a CD-ROM 32. The instructions with the computer program product are used to control the processor of the management component 28, when handling the installation of a new application 16.

Figure 8:
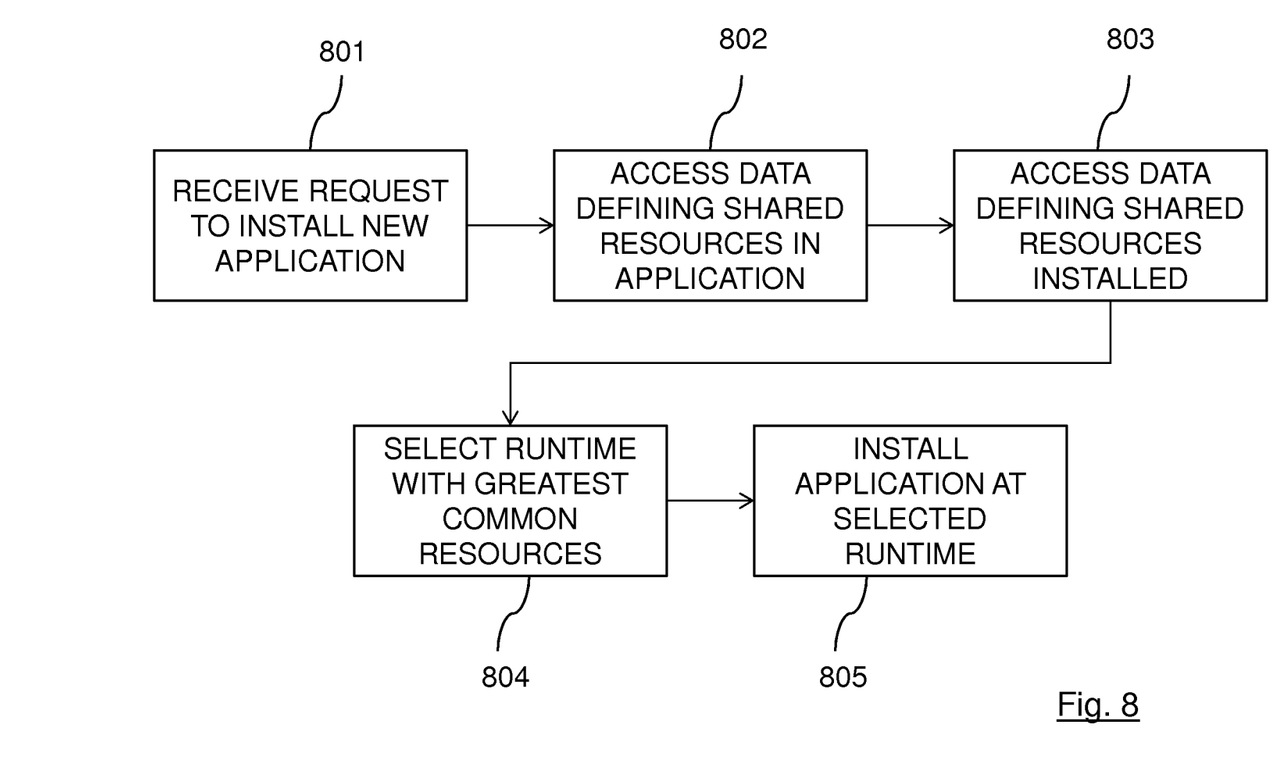
FIG. 8 is a flowchart of a method of installing an application in accordance with an embodiment.

The process embodied by the instructions on the computer program product is summarized in the flowchart of FIG. 8. The method of installing a new application 16 at a runtime instance 10 includes receiving a request to install an application 16 at block 801, accessing data defining shared resources 20 required by the application 16 at block 802, accessing data 24 defining shared resources 20 already installed at existing runtime instances 10 at block 803, selecting an existing runtime instance 10 with the greatest number of installed shared resources 20 common to the shared resources 20 required by the application 16 at block 804, and installing the application 16 at the selected runtime instance 10 at block 805.

In an embodiment of the present invention, a record of where shared resources are to be found is stored in a lookup table, e.g., lookup table 24. It will be appreciated by the skilled person that such records could be stored in and accessed from a number of different artefacts, for example, in a relational database.

As will be appreciated by one skilled in the art, aspects of the present invention may be embodied as a system, method and computer program product or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

What is claimed is:

1. A computer-executable method of installing an application at an existing runtime instance of a computer system, the method comprising:
   receiving, by at least one of a plurality of computers in the computer system, a request to install the application;
   accessing, by the at least one of the plurality of computers, first data that defines resources required by the application;
   accessing, by the at least one of the plurality of computers, second data that defines shared resources previously installed at a plurality of existing runtime instances;
   selecting, by the at least one of the plurality of computers, the existing runtime instance from the plurality of existing runtime instances that reduces an amount of data or bandwidth during an installing of the application, the selecting of the existing runtime instance being based on an analysis of the first and second data that identifies the existing runtime instance with a greatest number of installed shared resources common to the resources required by the application; and
   installing, by the at least one of the plurality of computers, the application at the existing runtime instance selected from the plurality of existing runtime instances.

2. The method of claim 1, further comprising:
   maintaining a table storing an identifier for each shared resource installed at each existing runtime instance, wherein the accessing second data that defines shared resources previously installed at existing runtime instances comprises accessing the table.

3. The method of claim 2, further comprising:
   subsequent to installing the application at the existing runtime instance selected from the plurality of existing runtime instances, updating the table with identifiers for each new shared resource installed during the installation of the application at the selected runtime instance.

4. The method of claim 1, further comprising:
   determining free capacity available the plurality of existing runtime instances, wherein the selecting of the existing runtime instance comprises selecting only an existing runtime instance with sufficient free capacity to install the application.

5. The method of claim 1, wherein the installing the application at the existing runtime instance selected from the plurality of existing runtime instances comprises removing from the application those shared resources previously present at the existing runtime instance and installing the residual components of the application at the existing runtime instance.

6. The method of claim 1, wherein the installed application includes links to the previously installed shared resources.

7. A computer system for installing an application at an existing runtime instances, the system comprising:
   a plurality of computers each arranged to run one or more runtime instances; and
   a management component installed within the computer system and coupled to the plurality of computers, the management component configured to:
   receive a request to install an application;
   access first data that defines resources required by the application;
   access second data that defines shared resources previously installed at a plurality of existing runtime instances;
   select an existing runtime instance from the plurality of existing runtime instances that reduces an amount of data or bandwidth during an installing of the application, the selecting of the existing runtime instance being based on an analysis of the first and second data that identifies the existing runtime instance with a greatest number of installed shared resources common to the resources required by the application; and install the application at the selected runtime instance selected from the plurality of existing runtime instances.

8. The system of claim 7, wherein the management component is further configured to:

maintain a table storing an identifier for each shared resource installed at each existing runtime instance, wherein the accessing second data that defines shared resources previously installed at existing runtime instances comprises accessing the table.

9. The system of claim 8, wherein the management component is further configured to:

subsequent to installing the application at the existing runtime instance selected from the plurality of existing runtime instances, updating the table with identifiers for each new shared resource installed during the installation of the application at the selected runtime instance.

10. The system of claim 7, wherein the management component is further configured to:

determine free capacity available the plurality of existing runtime instances, wherein the selecting of an existing runtime instance comprises selecting only an existing runtime instance with sufficient free capacity to install the application.

11. The system of claim 7, wherein the installing the application at the existing runtime instance selected from the plurality of existing runtime instances comprises removing from the application those shared resources previously present at the existing runtime instance and installing the residual components of the application at the existing runtime instance.

12. The system of claim 7, wherein the installed application includes links to the previously installed shared resources.

13. A computer program product, the computer program product comprising a non-transitory computer readable storage medium having program instructions for installing an application at an existing runtime instances of a computer system embodied therewith, the program instructions executable by at least one of a plurality of computers if the computer system to cause:

receiving a request to install the application;

accessing first data that defines resources required by the application;

accessing second data that defines shared resources previously installed at a plurality of existing runtime instances;

selecting the existing runtime instance from the plurality of existing runtime instances that reduces an amount of data or bandwidth during an installing of the application, the selecting of the existing runtime instance being based on an analysis of the first and second data that identifies the existing runtime instance with a greatest number of installed shared resources common to the resources required by the application; and installing the application at the existing runtime instance selected from the plurality of existing runtime instances.

14. The computer program product of claim 13, wherein the computer readable program code is further configured for:

maintaining a table storing an identifier for each shared resource installed at each existing runtime instance, wherein the accessing second data that defines shared resources previously installed at existing runtime instances comprises accessing the table.

15. The computer program product of claim 14, wherein the computer readable program code is further configured for:

subsequent to installing the application at the existing runtime instance selected from the plurality of existing runtime instances, updating the table with identifiers for each new shared resource installed during the installation of the application at the selected runtime instance.

16. The computer program product of claim 13, wherein the computer readable program code is further configured for:

determining free capacity available the plurality of existing runtime instances, wherein the selecting of the existing runtime instance comprises selecting only an existing runtime instance with sufficient free capacity to install the application.

17. The computer program product of claim 13, wherein the installing the application at the existing runtime instance selected from the plurality of existing runtime instances comprises removing from the application those shared resources already present at the existing runtime instance and installing the residual components of the application at the existing runtime instance.

18. The computer program product of claim 13, wherein the installed application includes links to the previously installed shared resources.

* * * * *